United States Patent [19]

Street

[11] Patent Number: 5,779,277

[45] Date of Patent: Jul. 14, 1998

[54] LOCKING ASEXUAL COUPLING

[75] Inventor: David G. Street, Pottstown, Pa.

[73] Assignee: Campbell Fittings, Inc., Boyertown, Pa.

[21] Appl. No.: 706,996

[22] Filed: Sep. 3, 1996

[51] Int. Cl.$^6$ ..................................................... F16L 33/00
[52] U.S. Cl. ............................ 285/79; 285/86; 285/316
[58] Field of Search ................................. 285/73, 76, 77, 285/78, 79, 81, 84, 85, 86, 316

[56] References Cited

U.S. PATENT DOCUMENTS

| | | |
|---|---|---|
| 699,366 | 5/1902 | Bowes, Jr. . |
| 724,324 | 3/1903 | Parsons ........................... 285/79 |
| 809,746 | 1/1906 | Rhoads . |
| 980,677 | 1/1911 | Rhoads . |
| 1,093,528 | 4/1914 | Bowes, Jr. . |
| 1,739,131 | 12/1929 | Van Ness Eick ............... 285/79 |
| 1,808,382 | 6/1931 | Stauffer .......................... 285/79 |
| 3,162,470 | 12/1964 | Davidson et al. . |
| 3,201,151 | 8/1965 | Westveer . |
| 3,583,667 | 6/1971 | Amneus, Jr. . |
| 4,553,587 | 11/1985 | Traylor . |
| 5,026,024 | 6/1991 | Ito . |
| 5,301,985 | 4/1994 | Terzim ........................... 285/79 |
| 5,333,915 | 8/1994 | Sparling et al. ................ 285/78 |
| 5,388,864 | 2/1995 | Kozinski ......................... 285/79 |

FOREIGN PATENT DOCUMENTS

| | | | |
|---|---|---|---|
| 52710 | 2/1973 | Denmark .................. | 285/86 |
| 2421327 | 11/1979 | France ....................... | 285/86 |
| 626302 | 9/1978 | U.S.S.R. ..................... | 285/86 |
| 22467 | 12/1900 | United Kingdom ....... | 285/86 |
| 812041 | 4/1959 | United Kingdom ....... | 285/86 |

OTHER PUBLICATIONS

National Coupling Company, Inc.'s "National Coupling Company Catalog", 2 pages, undated.
Ludecke, Inc.'s catalog pp. 6–9, undated.
Dixon Valve & Coupling Company, 2 catalog pages—p. 8 and unnumbered page, ©1993 DV&C Co.

*Primary Examiner*—Eric K. Nicholson
*Attorney, Agent, or Firm*—Synnestvedt & Lechner

[57] ABSTRACT

A quick disconnect asexual locking hose coupling is provided having a spring biased coaxial sleeve with a locking projection and a sealing means having an internal gland for use with universal type hose couplings typically found in pneumatic service applications. The locking hose coupling provides enhanced safety, better sealing and ease of use over typical universal hose couplings while retaining the advantages of robustness, versatility, convenience and compatibility with the most numerous type of coupling in current use.

21 Claims, 5 Drawing Sheets

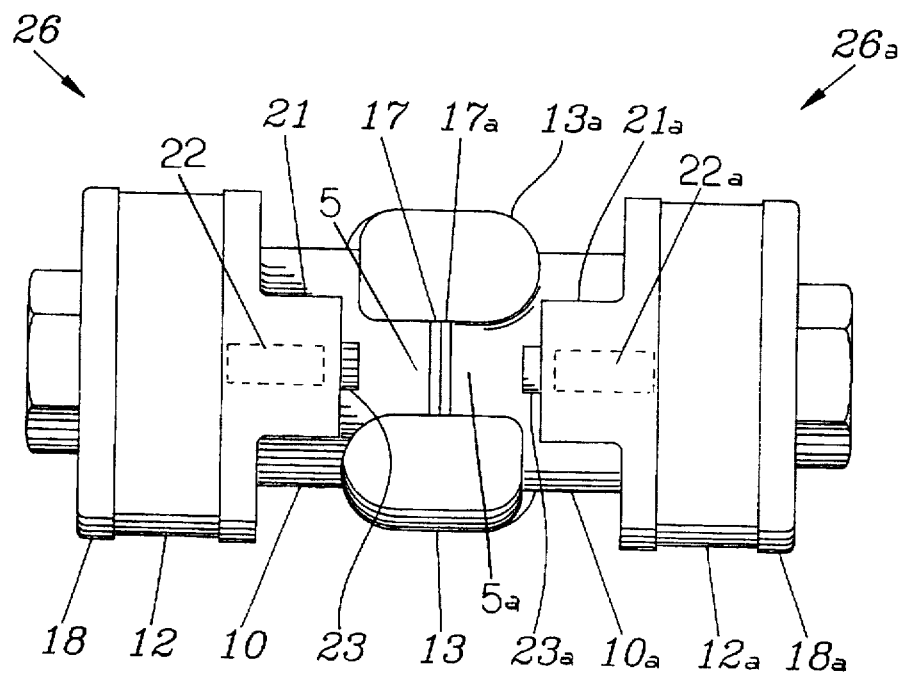
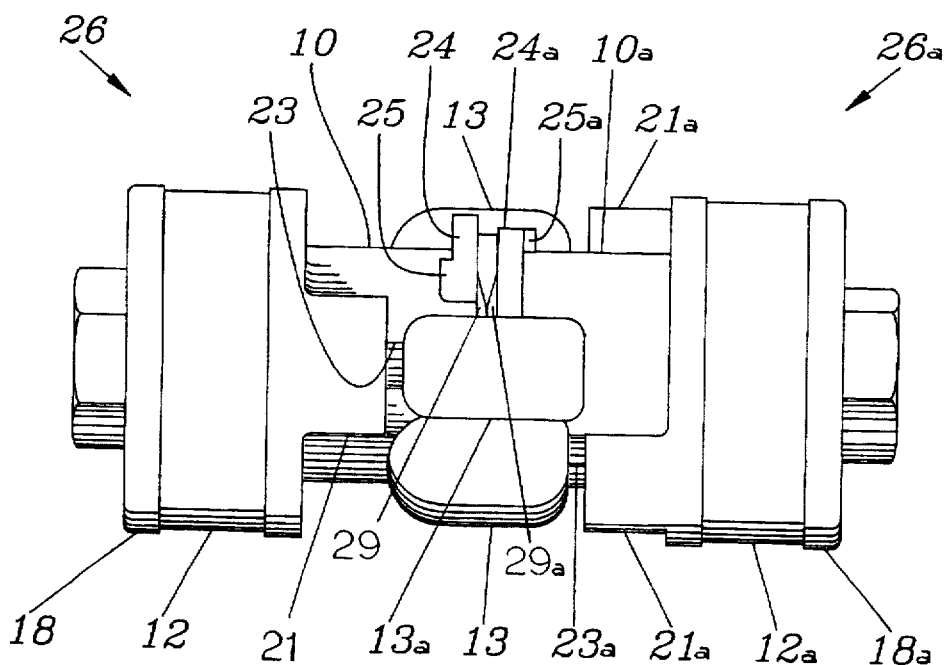

LOCKING ASEXUAL COUPLING

FIELD OF THE INVENTION

This invention relates to quick disconnect hose couplings and especially to asexual type quick disconnect hose couplings of the so-called "universal" type.

BACKGROUND OF THE INVENTION

There are various quick disconnect style hose couplings, many of which are suitable for pneumatic service as well as other applications. One of the most common hose couplings is an asexual design referred to as a "universal" or "claw" coupling. A salient feature of asexual type couplings such as the universal coupling is that any universal coupling will mate with any other universal coupling of the same size. Asexual couplings thus hold a distinct advantage over sexual type couplings which are constrained to couple only with a mating coupling and often are the cause of frustration and inconvenience when the proper mating couplings are not available.

As a result of their advantage and consequent convenience, the universal coupling is the most popular pneumatic coupling used to couple hoses from ½" through 1" in diameter. Universal couplings are used extensively throughout industry and the construction trades and may typically be found on pneumatic tools such as a jackhammer.

The typical universal coupling has a cylindrically shaped coupling body with an axial bore through the middle serving as a fluid passage. The head or coupling end of the body has a pair of radially extending diametrically opposed flange segments and radially extending diametrically opposed claws which have side opening pockets in them to receive mating flange segments from another universal coupling. The flange segments have protruding nubs which interlock with undercuts formed within the pockets on the claws. The flange segments also have holes which align with similar holes in the flanges of a mating coupling when two couplings are engaged, allowing a locking pin to be inserted which passes through the holes in a flange segment of each mating coupling preventing relative rotation of the couplings. On the coupling body between the flange segments and the claws are landing areas of the same basic diameter as the body which initially receive the claws of a mating coupling when couplings are joined. The coupling body further has an end opening at the head or coupling end with an enlarged inside diameter and an internal recess which retain a gasket seal typically located in the end opening.

Universal couplings are produced in greatest quantity as sand castings of malleable iron. The couplings are typically zinc plated to inhibit rusting. In far smaller quantities, universal couplings are also produced in stainless steel or brass by either investment or sand casting techniques for use in more corrosive environments. Although the primary purpose of these couplings is for air service of 100 psi, they also may be used for low pressure water service. They are not recommended for steam service, the pressure typically being too high, thus, preventing effective sealing of coupling. Universal couplings are also not recommended for chemical, volatile gas or liquid service because of the corrosive effect such substances can have on both the couplings and especially the seals.

Although universal couplings do offer the advantage of being asexual, as outlined above, and are relatively inexpensive typical universal couplings do pose some problems.

Due to the nature of the mating, universal couplings are difficult to couple and uncouple. Mating two universal couplings requires manually forcing the coupling heads together and compressing the relatively stiff gaskets at the end openings in each coupling sufficiently to align the flange segments of each coupling with the side opening pockets of the claws on the mating coupling. The couplings must next be twisted relatively to each other, interfitting the flange segments within the side opening pockets. The compressive force on the gaskets is then released allowing some relaxation of the compressive forces on the gasket as the couplings move apart under the compressive force of the gaskets, the protruding nubs engaging the undercuts in the pockets. The gaskets, however, remain substantially under compression, the claws holding the flange segments axially within their side opening pockets against the force of the compressed gaskets, relative rotation between the mating couplings being prevented by the flange segment protruding nubs engaging the undercuts of the claw side opening pockets.

As difficult as it is to mate these couplings, twisting forces imposed on the hose in normal use may nevertheless inadvertently disconnect them. A hose under pressure suddenly and unexpectedly disconnected can create a hazardous situation, the hose whipping wildly in free space as the pressurized fluid vents to the atmosphere. The hose and its heavy metal coupling may hit and kill or injure an operator or cause other damage. Every year many injuries are caused by universal couplings uncoupling unexpectedly while in use despite the fact that they are used at moderately low pressures, typically 100 psi.

Inadvertent twisting motion of the couplings cannot be reliably prevented only by the flange segment protruding nubs engaging the undercuts of the claw side opening pockets. The nubs and the undercuts are subject to considerable wear due to contact friction as the couplings are coupled and decoupled. Thus, each time a coupling is used, it is less reliably coupled as the nubs and pocket undercuts grind against each other, wear each other out and eventually lose all capacity to prevent relative rotation of the couplings. The nubs, flange segments and claws are further exposed to damage due to the rough treatment typically experienced by the couplings at the worksite. Damaged flange segments having a crack or gouge or protruding nubs scarred or partially sheared off cannot be expected to effectively lock the couplings together. Furthermore, the gaskets which provide the biasing force keeping the nubs engaged with the undercuts wear with use and lose resiliency with age or under temperature extremes, thus providing inadequate biasing force and preventing even unworn nubs and undercuts from properly and effectively functioning to prevent unexpected decoupling.

While it is true, as noted above, that the flange segments are typically provided with holes which align when the couplings are engaged, thereby allowing the insertion of a safety device such as hitch pin, nail or even a wire to prevent the coupling parts from twisting and disconnecting, this type of safety lock is not always effective. Often the holes do not line up properly, making it impossible to insert the pin. The pin, being a separate part, is easily lost. Operators often deliberately choose not to use the pin because it is inconvenient or presents an extra step to perform when coupling or uncoupling a tool from an air source. Often when a safety pin is used the pin can become disengaged when the hose is dragged over the ground or other surface, as typically happens in use. Even universal couplings that have been safety pinned have been known to twist and disconnect. Considering the potential danger posed by a universal coupling unexpectedly disconnecting under pressure, it is easy to understand the high risk involved in producing, selling and using these couplings in their current configuration. There is clearly a need for a universal coupling which is safer and easier to use.

Although there are many examples of quick disconnect couplings, none of these examples completely addresses the problems outlined above. U.S. Pat. Nos. 699,366 and 1,093, 528 to Bowes, Jr., U.S. Pat. Nos. 809,746 and 980,677 to Rhoads and U.S. Pat. No. 3,162,470 to Davidson et al all recognize the need for safe and reliable quick disconnect hose couplings having an effective locking feature. However, these examples are all sexual type couplings having malefemale relationships, thereby foregoing the convenience and versatility of the asexual type coupling. While the coupling disclosed in U.S. Pat. No. 3,201,151 to Westveer is an asexual type, this coupling is suited to high pressure applications (typically 2,500 psi or higher), is complicated, relatively expensive and clearly would not stand up to the rough treatment typically meted out to pneumatic tool couplings in a workshop or at a construction site.

The National Double-Lock coupling is another asexual coupling with a safety locking feature comprising a spring biased sleeve which positions a locking stub against a projecting toothed arcuate segment, preventing relative rotation of couplings when engaged. The Double-Lock coupling is relatively expensive, however, and cannot couple with the existing universal couplings currently in extensive use.

SUMMARY AND OBJECTS OF THE INVENTION

The invention is a locking hose coupling which has all the characteristic features of a universal coupling as described in detail above. The invention incorporates locking means which in preferred embodiment comprises a coaxial sleeve surrounding the coupling body. The sleeve is capable of axial motion along the body and is biased toward the end opening of the coupling by a spring. The sleeve has at least one inwardly projecting key which rides in an axially oriented keyway in the coupling body. The key and keyway mate to allow axial motion of the sleeve but prevent relative rotational motion between sleeve and coupling body. The sleeve further has at least one but preferably two diametrically opposed axially extending locking projections which occupy respective locking positions overlying the landing regions intermediate between the flange segments and claws when the sleeve is positioned adjacent to the end opening of the coupling.

The locking hose coupling has a gasket or other type of sealing means disposed at its end opening which compressively mates with a gasket in the universal coupling to effect a relatively tight joint. Gaskets normally used with standard universal couplings are typically made of an oil resistant resilient elastomeric material such as Buna-N with a durometer or hardness in the range of 70–90 on the Shore A scale. Such gaskets are difficult to compress manually due to their relatively great stiffness but this stiffness is essential to maintaining the coupling parts in locked relationship. The present invention permits use of relatively less stiff or thinner gaskets thereby facilitating ease of manual coupling of the locking hose coupling. Preferably the gaskets are made of a more compliant material such as Buna-N with a Shore A scale durometer in the range of 40–60 and preferably 60 to reduce the manual compressive force necessary to mate the locking hose coupling with a universal coupling or another locking hose coupling. The gasket may include an internal gland which provides an area on the back face of the sealing surface upon which air pressure within the hose can act to effect a sealing force between the mating gaskets. Less gasket compression can be tolerated with a locking hose coupling according to the invention because unlike a typical universal coupling, the gasket compression forces are not required to prevent relative rotation of the mated couplings or ensure a tight seal. The locking means effectively prevents undesired rotation of the couplings and the gasket internal gland uses the air pressure in the line to effect a tight seal.

In operation, as for example, when coupling with a universal coupling, the locking hose coupling according to the invention is brought into alignment with the universal coupling, the claws of the universal coupling being aligned with the landings between the claws and flange segments on the locking hose coupling. The sleeve is withdrawn against the biasing action of the spring and the respective end openings are manually brought together into interfacing relationship, compressing the gaskets disposed in the end openings of each coupling. The flange segments on each coupling are aligned with the side opening pockets in the claws of the mating coupling, and the locking hose coupling is manually rotated relatively to the universal coupling, causing the flange segments on each coupling to interfit within the pockets of the claws on the mating coupling. The locking projections are then free to move under the action of the biasing spring into a locking position overlying the landings on the locking hose coupling, effectively blocking relative rotation of the couplings in a direction effecting removal of the flanges from the pockets by contacting a claw on the mating coupling. When the manual compressive force on the gaskets is released the gasket compression relaxes somewhat as protruding nubs on the flange segments interfit into the undercuts in the side pockets of the mating claws as when two universal couplings mate.

Disconnecting the locking hose coupling from the universal coupling proceeds preferably by withdrawing the sleeve axially against the biasing spring, thereby removing the locking projections from their respective locking positions and allowing relative rotation of the couplings. The couplings are then manually forced together compressing the sealing gaskets and allowing the protruding nubs to disengage from the undercuts in the side opening pockets of the claws. The couplings are then relatively rotated in the direction which removes the flange segments from the side pockets of the claws, and the couplings can finally be axially disengaged from their interfacing relationship once the flange segments clear the claw side pockets.

Connecting or disconnecting a locking hose coupling according to the invention to or from an identical locking hose coupling proceeds as described above, but those actions specific to the locking hose coupling are performed simultaneously for both couplings.

It is an object of the invention to provide a relatively safe hose coupling with a reliable locking feature effectively preventing the hose from unexpectedly decoupling while in use and presenting a hazard to personnel and property.

It is a further object of the invention to provide a hose coupling which is easy to manually couple and decouple quickly.

It is still another object of the invention to provide a hose coupling which does not depend on gasket compression forces to provide a tight seal to the coupling joint.

It is yet another object of the invention to provide a locking hose coupling of robust design capable of withstanding rough treatment and still function effectively.

It is a further object of the invention to provide an inexpensive and reliable locking hose coupling of an asexual nature which is compatible with existing universal type couplings currently in extensive use.

BRIEF DESCRIPTION OF THE DRAWING

FIG. 6 is a side view showing two locking hose couplings with respective coaxial sleeves withdrawn against their respective biasing means away from the respective end openings of the couplings;

FIG. 7 is a side view showing two locking hose couplings rotated relatively to one another when compared with FIG. 6 and moved axially apart;

DETAILED DESCRIPTION OF THE PREFERRED

Embodiment of the Invention

Figure 1:
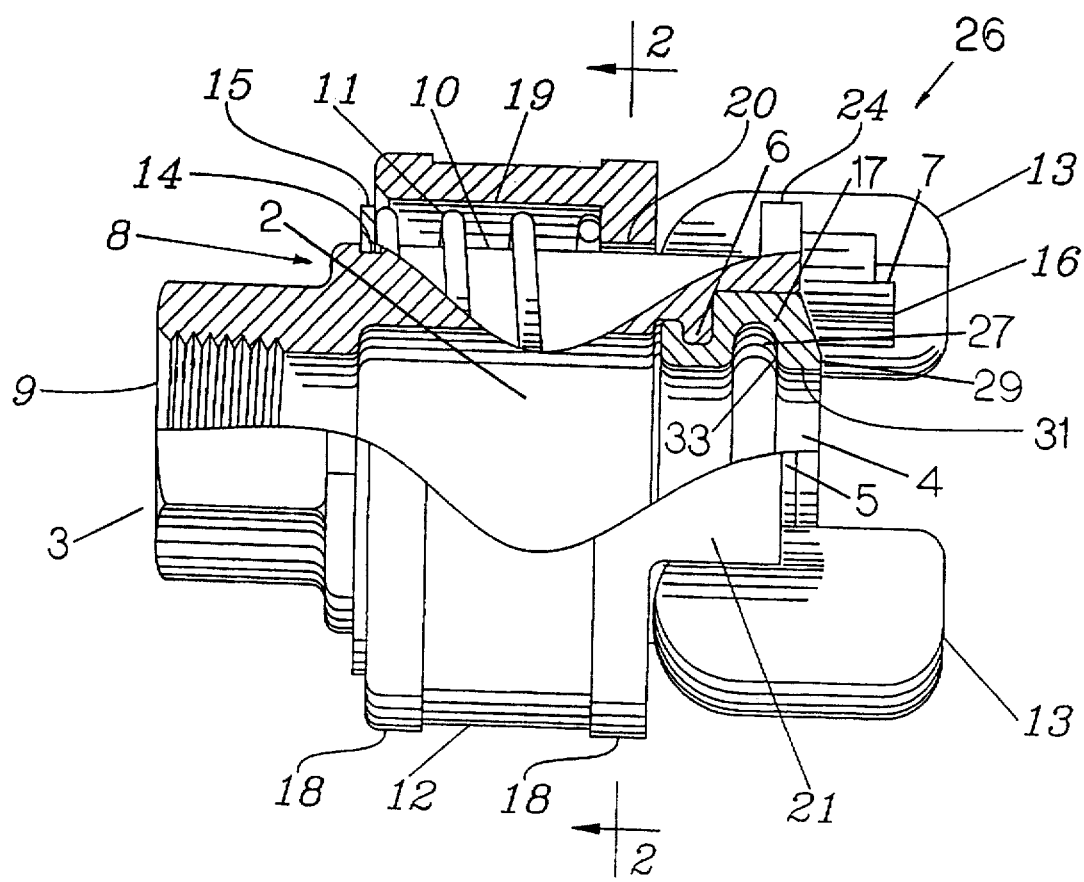
FIG. 1 is a side view, partially cut away, of a locking hose coupling according to the invention.

FIG. 1 shows a preferred embodiment of a locking hose coupling 26 according to the invention. Locking coupling 26 is designed to mate with existing standard universal type couplings described in Federal Specification WW-C-633C (herein incorporated by reference) and shown at 28 in FIG. 8. The unmodified or standard universal coupling of FIG. 8 comprises a coupling body 30 having a central bore or air passage 32 and an inlet end 34 and an outlet end 36. Sealing means typically a relatively stiff gasket 38 of about 70–90 durometer (Shore A scale) is disposed at outlet end 36 and is retained within coupling body 30 by an internal recess 40. A pair of diametrically opposed claws 42 are located adjacent to outlet end 36 and extend radially from coupling body 30. A pair of diametrically opposed flange segments, one of which is shown partially cut away at 44, project radially from coupling body 30. Each flange segment has a protruding nub 46 projecting away from outlet end 36, and each flange segment extends circumferentially around coupling body 30 from a respective claw to a point spaced away from the other claw, leaving a gap or landing between the end of each flange segment and an opposing claw. Claws 42 have side opening pockets 48 which receive flange segments 44 of a mating universal coupling when the couplings are interengaged. Side opening pockets 48 have undercuts 50 which engage protruding nubs 46 on flange segments 44 and serve as a locking means to prevent relative rotation of mated couplings. Gaskets 38 in each of the mating couplings are compressed against one another when the couplings are interengaged. Claws 42 engaging flange segments 44 on mating couplings retain the mating couplings together and keep the gaskets under compression. The gaskets forced together under compression thus provide a sealing action rendering the coupling joint airtight. The gaskets when under compression, being relatively stiff and non-compliant, provide a force tending to push the couplings apart. This gasket force keeps protruding nubs 46 engaged against undercuts 50, effecting a locking function preventing relative coupling rotation on the unmodified or standard universal coupling 28.

In the preferred embodiment according to the invention, the coupling 26 has the capability of coupling with an identical mating coupling 26a, as shown in FIGS. 3–7, wherein like elements of coupling 26a are identified by like reference characters followed by a letter "a" or with a standard universal coupling member 28.

The couplings 26 and 26a have all of the features of universal coupling 28 plus locking means and preferably also an improved seal or gasket, as described in detail below. Locking couplings 26 and 26a are easier to use than the universal type coupling 28, as will be explained in detail. By virtue of its locking means, locking coupling 26 also affords a greater degree of safety when used with a universal coupling but especially when used with another locking coupling according to the invention, as is illustrated in FIGS. 3–7.

With reference first to FIG. 1, locking coupling 26 has a cylindrical coupling body 8 comprising a main body 10 having axial bore 2, an inlet end 3 with an inlet 9 and an outlet end opening 4 opposite inlet 9. Inlet 9 is shown with female pipe threads though it, may instead have male pipe threads, a barbed hose end, be closed to form a cap or plug or any other suitable attachment arrangement as may be required. The outer surface of the inlet end 3 may have a polygonal shape to facilitate ease of installation with a wrench or other tool. The inside surface of main body 10 may be stepped or flanged, as shown at 6 in FIG. 1, to hold a sealing means, preferably a gasket 17, in place at the end opening 4.

Figure 8:
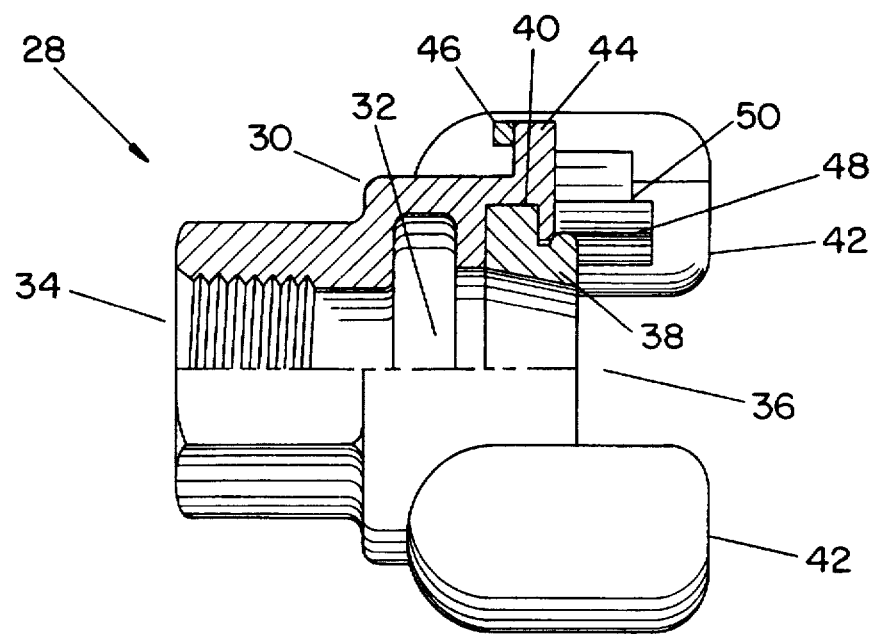
FIG. 8 is a side view, partially cut away, of an unmodified or standard universal type coupling.

Gasket 17 has an annular concavity 27 located behind a sealing surface 29. The juxtaposition of concavity 27 with sealing surface 29 forms gasket internal flexible gland 31 between the concavity and the sealing surface having a back surface 33 upon which air pressure is intended to act to effect a tight seal as will be explained in detail later. The presence of the gland forming concavity 27 makes gasket 17 relatively more easily compressible when compared with gasket 38 on the standard universal coupling as shown in FIG. 8. The gasket 17 can also be made of a material with a relatively lower durometer than used for gasket 38 making the gasket 17 even more compliant. For example, gasket 17 could be made from an elastomeric, oil resistant Buna-N material with a durometer between 40 and 60 and preferably 60 on the Shore A scale of hardness. Such a gasket would be significantly more flexible than gasket 38, which is typically made from material having a Shore A scale hardness between 70 and 90.

A pair of radially projecting claws 13 are disposed diametrically opposed to one another on main body 10 adjacent to end opening 4 as shown in FIG. 1. Flange segments 24 project radially from main body 10 adjacent to each claw 13 as perhaps best seen in FIGS. 4 and 9. The flange segments extend circumferentially on main body 10 from each of the oppositely disposed claws 13 to a point spaced away from the other claw. The regions of main body 10 which lie between each flange segment and the respective other claw comprise a pair of diametrically opposed landings 5, best illustrated in FIGS. 3, 6 and 9.

Figure 3:
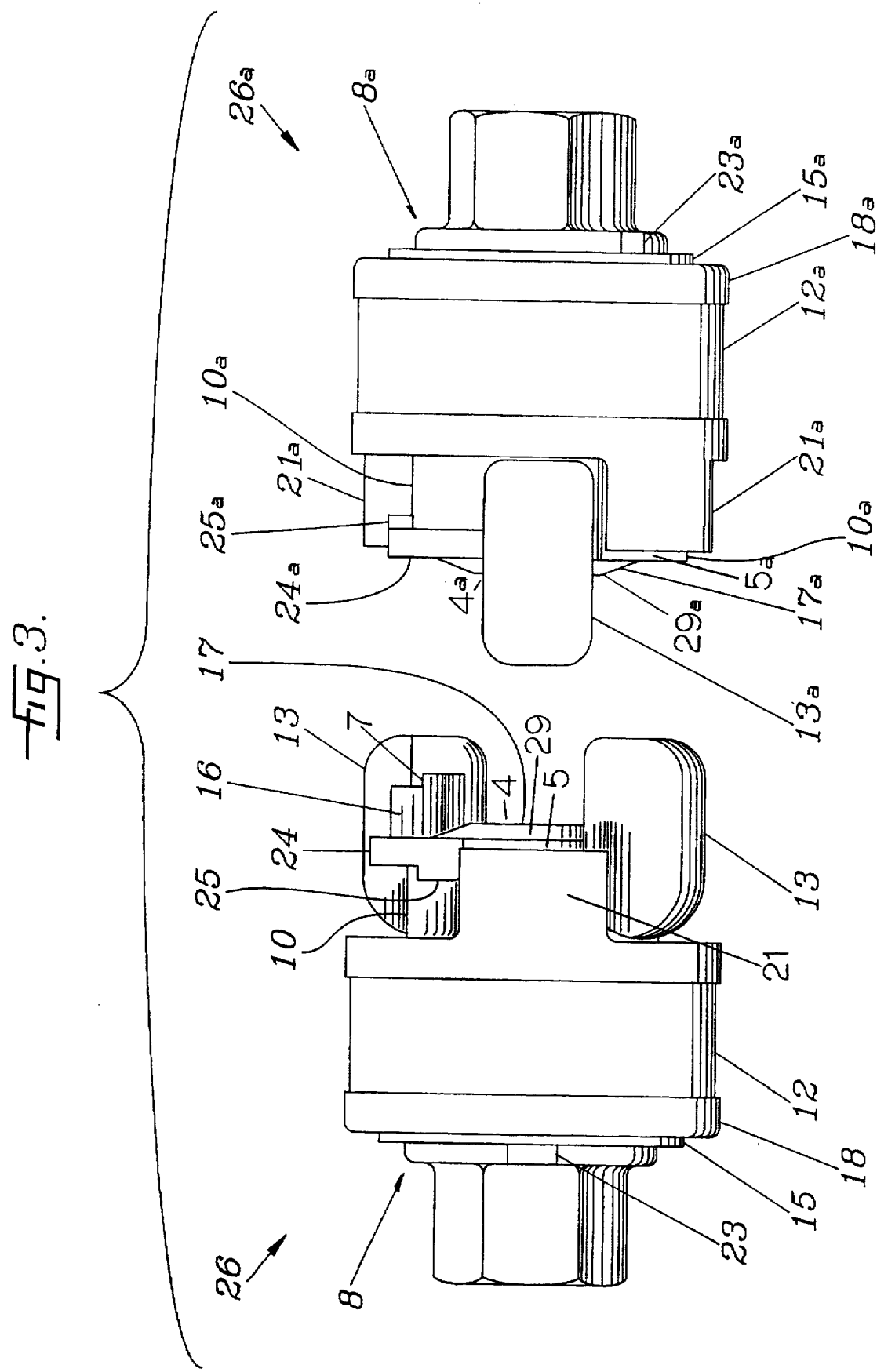
FIG. 3 is a side view showing two locking hose couplings according to the invention being aligned for locking engagement.
Figure 9:
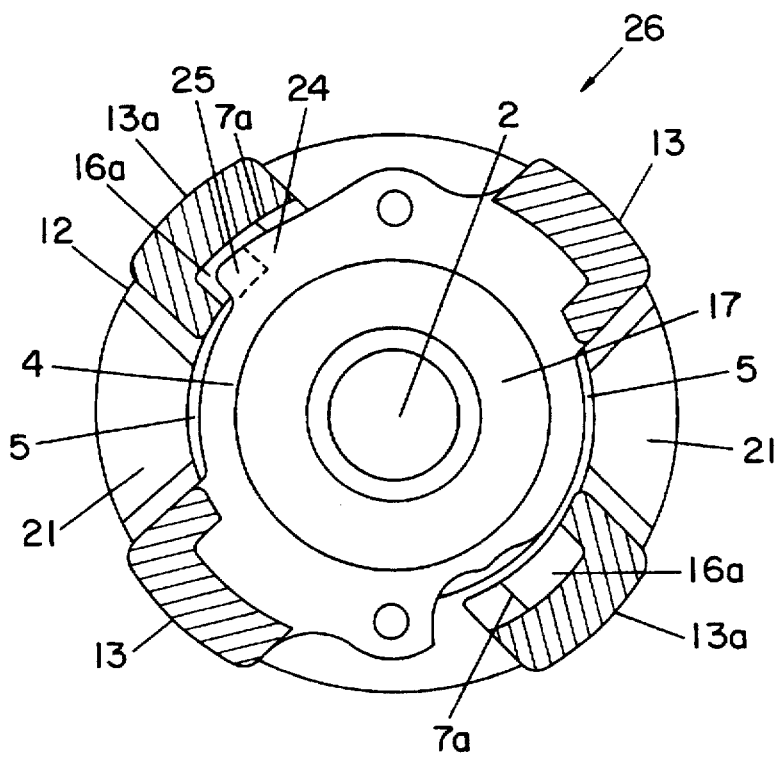
FIG. 9 is a sectional view taken along line 9—9 of FIG. 5 and partially cut away.

A protruding nub 25 is arranged on each flange segment 24 adjacent to each landing 5. Nubs 25 project away from end opening 4. As illustrated in FIGS. 3 and 9, each claw 13 on coupling 26 has a side opening pocket 16 shaped to receive a flange segment 24a with nubs 25a of a mating coupling 26a, and on coupling 26, each flange segment 24 with its protruding nub 25 is sized to interfit within the side opening pocket 16a of a claw 13a (see FIG. 9) of a mating coupling 26a.

The locking feature of the coupling according to the invention is effected by locking means which preferably comprises a coaxial sleeve 12, shown in partial cut away in FIG. 1. Sleeve 12 is substantially in the shape of a hollow cylinder, the outside of which is provided with finger grip steps 18 to increase manual gripping ease. A biasing means, preferably coil spring 11, fits between sleeve 12 and main body 10 and biases coaxial sleeve 12 in the direction of outlet end opening 4. Means for retaining the biasing means comprise a circular groove 14 located in the outer periphery of the main body portion 10 which accepts a snap ring 15 which spring 11 rests against. The inside surface 19 of the main portion of sleeve 12 is sized to accept the spring 11 and pass freely over the snap ring 15. The sleeve has an end portion 20 of reduced inside diameter facing end opening 4 which freely moves over the main body 10 and provides a retaining shoulder for spring 11.

Although one locking projection may be employed, sleeve 12 preferably has a pair of diametrically opposed locking projections 21 which extend axially from sleeve 12 toward end opening 4. The cross section of each locking projection 21 is shaped like a segment of an annulus, as best seen in FIG. 9. When sleeve 12 is biased toward end opening 4 locking projections 21 each occupy a locking position in which the projections 21 substantially overlay landings 5 on main body 10, as seen on coupling 26 in FIG. 3.

Figure 2:
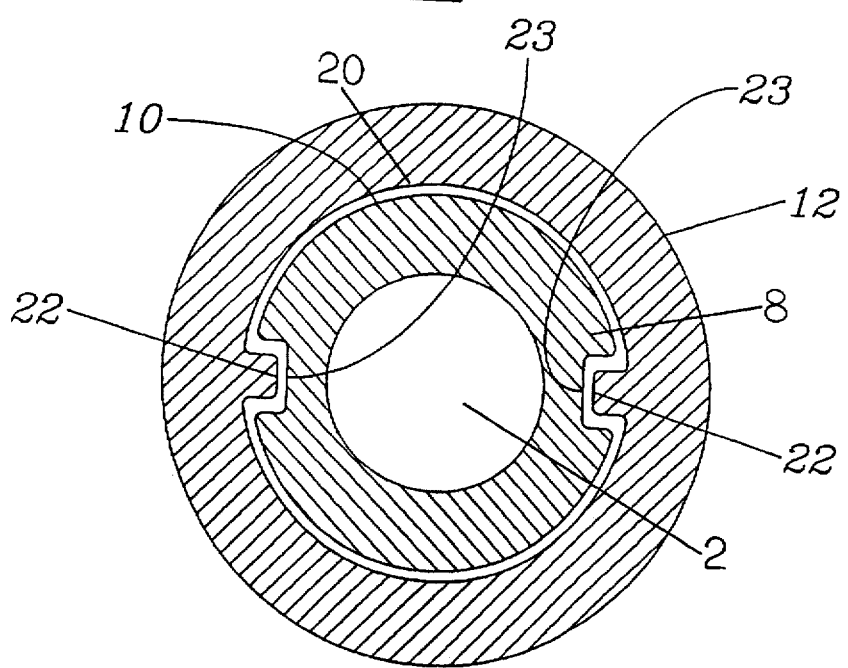
FIG. 2 is a sectional view taken along line 2—2 of FIG. 1.

The coaxial sleeve 12 has inwardly projecting radial keys 22, rectangular in section, one disposed on the inner surface of each locking projection 21 as shown in cross section in FIG. 2. Keys 22 extend axially along the centerline of each locking projection 21 substantially for each projection's entire length, as seen in phantom line in FIG. 6. Each key 22 interfits into an axially oriented radial indentation or keyway 23 disposed in main body 10. Key 22 and keyway 23 are sized to prevent rotation of coaxial sleeve 12 relatively to coupling body 8 while allowing the coaxial sleeve 12 to slide away from end opening 4 against the action of biasing spring 11, thereby moving locking projections 21 out of overlying relationship with landings 5 and thus out of their respective locking positions, as best shown in FIG. 6.

Figure 4:
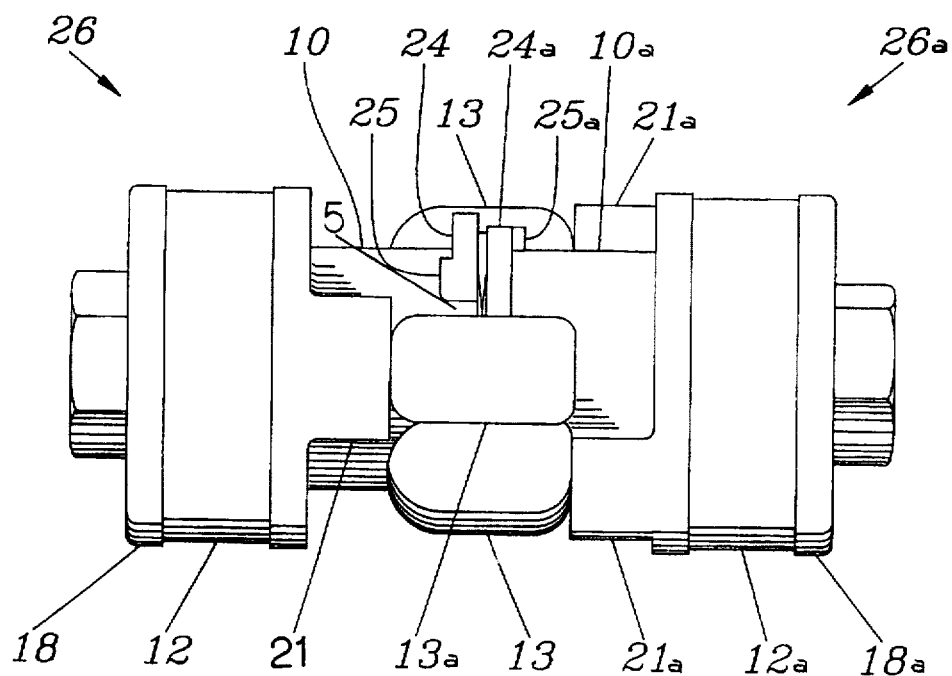
FIG. 4 is a side view showing two locking hose couplings being moved axially, the axially projecting locking projections being moved axially against the action of the biasing means.

To connect two locking hose couplings according to the invention, two mating couplings shown at 26 and 26a in FIG. 3 are positioned with claws 13 and 13a initially aligned with landings 5a and 5 respectively on the opposite mating coupling. The two mating couplings 26 and 26a are then manually moved axially together as shown in FIG. 4. Upon the axial movement, respective end openings 4 and 4a (visible in FIG. 3) are brought into interfacing relationship by compressing gaskets 17 and 17a (FIG. 3) against each other. As the gaskets are compressed together sealing surface 29 of gasket 17 contacts sealing surface 29a on gasket 17a and the internal gland 31 deflects relatively easily into the respective annular concavity 27 immediately behind the gland, its counterpart on the mating gasket deflecting similarly into its respective concavity. Less axial force is required to compress the gaskets of the locking hose couplings 26 and 26a due to the lower durometer material comprising the gaskets, the shape of the gland 31 and the positioning of the concavity 27 than is required to mate universal couplings. These features make the locking hose couplings easier to couple manually. The internal gland gasket design also provides improved joint sealing, as will be explained later.

Figure 5:
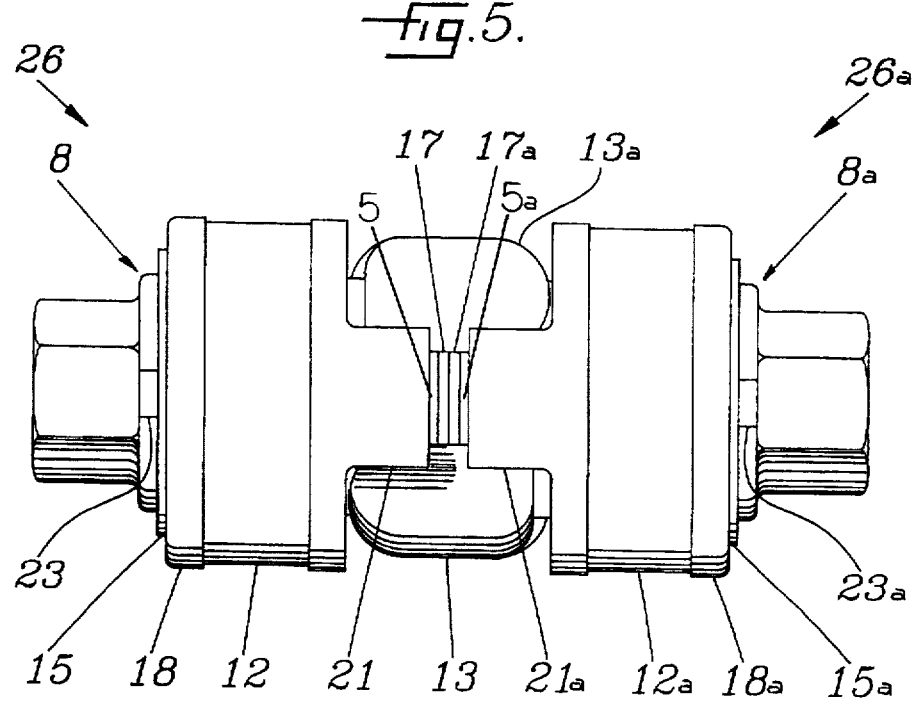
FIG. 5 is a side view showing two locking hose couplings with end openings in interfacing relationship, one of the couplings being shown rotated relatively to the other when compared with FIG. 4, the locking projections shown in a locking position intermediate between the flanges and the claws.

Continuing on to the next step of the procedure for connecting two locking hose couplings, coaxial sleeves 12 and 12a are moved against their respective biasing means to a position away from respective end openings 4 and 4a, and respective locking projections 21 and 21a on each coupling are moved out of their locking positions overlying landings 5 and 5a respectively, as seen in FIG. 4. When the gaskets 17 and 17a are sufficiently compressed, as shown in FIG. 5, flange segments 24 and 24a on each coupling align with side pockets 16a and 16 respectively in claws 13a and 13 respectively of each coupling. The couplings are then manually relatively rotated so as to interfit the flange segments 24 into receiving side pockets 16a of the claws 13a, as shown in FIG. 9, and interfit the flange segments 24a into receiving pockets 16 of the claws 13 on each respective mating coupling.

When released from the manual compressive force the couplings separate slightly due to the slight relaxation of elastic force in the compressed gaskets 17 and 17a. Side pockets 16 and 16a in claws 13 and 13a are undercut, as shown in FIG. 1 at 7 and FIG. 9 at 7a, allowing the protruding nubs 25 (shown in phantom in FIG. 9) and 25a to ride against the undercuts 7a and 7 respectively under the compression from the gaskets 17 and 17a, thus preventing relative rotation of the couplings unless the couplings are manually compressed so that the nubs can clear the undercuts.

Upon relative rotation of the couplings to the positions in which they are interconnected (FIG. 5) the locking projections 21 and 21a on each respective coaxial sleeve 12 and 12a are free to move axially under the respective action of spring 11 and the spring biasing sleeve 12a back into their respective locking positions overlying landings 5 and 5a respectively on main bodies 10 and 10a adjacent end openings 4 and 4a respectively. When occupying their locking positions, as seen best in FIG. 5, the locking projections 21 and 21a on each coupling each engage a claw 13a and 13 respectively on the mating coupling and block the relative rotation of the couplings in the direction which would disengage flange segments 24 and 24a from side pockets 16a and 16 in claws 13a and 13 respectively. Blocking engagement of locking projections 21 with claws 13a is best illustrated in FIG. 9.

In a standard universal coupling (FIG. 8) the compressive force between the gaskets 38 is relied on to effect a tight seal between the mating couplings and to provide the biasing force required to keep the protruding nubs 46 engaged with undercuts 50 which prevent relative rotation and disengagement of the couplings. Thus, the gaskets 38 must provide sufficient stiffness to accomplish both functions, and the stiffer the gaskets 38 are, the better the universal hose couplings will perform effecting a tighter seal allowing greater internal pressures to be carried by the hoses and providing increased safety against undesired uncoupling. However, these factors work against ease of coupling and uncoupling which must be done manually. Thus, the standard universal design requires a design compromise between the competing parameters of joint tightness and safety, on the one hand, against ease of manual use on the other. The locking hose coupling of the invention however does not suffer this disadvantage since it facilitates the use of a highly compliant gasket and especially the use of internal gland 31 in gasket 17 combined with the locking means. Gland 31 is inherently flexible due to both being made of a relatively lower durometer elastomeric material and its shape defined largely by the annular concavity 27. When the gaskets 17 and 17a are compressed together, gland 31 and its counterpart easily deflect into their respective annular concavities, making the locking hose couplings much easier to join. The compressive force between the compressed gaskets is much lower than found between standard universal couplings, but this is acceptable because the compressive force is not used to effect the seal or lock the couplings against rotation. Sealing between the gaskets is effected by the internal air pressure within the hose acting on the back surface 33 of gland 31 and the counterpart back surface, forcing the gland in one fitting against the sealing surface in the other fitting in direct proportion to the internal air pressure. Since relative rotation of the couplings is prevented by the blocking action of the locking projections 21 and 21a engaging claws 13a and 13, the gasket stiffness can be tailored by varying shape and durometer to permit greater ease of manual coupling.

To decouple the locking hose coupling units 26 and 26a, coaxial sleeves 12 and 12a are moved axially against their respective biasing means, as shown in FIG. 6, moving locking projections 21 and 21a out of overlying relationship with landings 5 and 5a, respectively. Simultaneously the couplings are manually axially compressed allowing protruding nubs 25 on flange segments 24 to disengage and clear undercut 7a in side pockets 16a in claws 13a and protruding nubs 25a on flange segments 24a to disengage undercut 7 in side pockets 16 in claws 13. With both the locking projections out of their locking positions and the protruding nubs clear of the undercuts, relative rotation of the coupling units 26 and 26a is no longer blocked, and as seen in FIG. 7, the units may be rotated relatively to one another, removing flange segments 24 from side pockets 16a in claws 13a and flange segments 24a from side pockets 16 in claws 13. Once the flange segments are completely clear of the side pockets, compressive forces between the gaskets 17 and 17a push the couplings apart, effectively disengaging the end openings 4 and 4a from their interfacing relationship, as seen in FIG. 7.

Coupling and uncoupling a locking hose coupling from a universal coupling proceeds essentially as outlined above with the exception that only one coupling has a coaxial sleeve. Although the locking hose coupling is designed to be used with universal couplings, an increased safety advantage is obtained if both hose couplings joining a particular hose segment are locking hose couplings according to the invention. If only one locking hose coupling is used, for example, it is possible that when a coupled hose is dragged along the ground, the coaxial sleeve 12 could be moved against its biasing spring 11 by contact with something on the ground, for example, debris or a curb stone. Such unintended contact might move the sleeve and hence the locking projections away from their locking positions and allow inadvertent rotation and decoupling of the hose segments. If two locking hose couplings are used when the couplings are dragged over the ground, any contact which would tend to move one sleeve against its biasing spring would tend either to move the other sleeve on the mating coupling tighter against the locking position or not move the other sleeve at all. Thus, at least one sleeve having locking projections would always be in the locking position effectively blocking relative rotation of the mating couplings until intentionally disengaged by the operator.

The locking hose coupling according to the invention provides greatly enhanced safety and ease of use over existing universal couplings while simultaneously retaining the inherent advantages of an asexual coupling compatible with the vast majority of couplings in current use.

I claim:

1. A locking hose coupling comprising a pair of mating couplings for joining hose segments, each of said mating couplings including a coupling body with an axial bore, an end opening, radial claws and interspaced diametrically opposed flange segments adjacent said end opening, each said claw having a side opening pocket positioned to receive a flange segment on the other coupling of said pair, the improvement comprising:

a coupling locking means comprising a coaxial sleeve on said coupling body for axial movement thereon, said locking means further comprising a locking projection extending axially from said sleeve in the direction of said end opening;

means for axially biasing said locking means to a locking position blocking relative rotation of the flange of one coupling and the claw of the other coupling, said biasing means urging said locking projection into said locking position intermediate one of said claws and said flange segments, said projection being movable axially away from said locking position by movement of said sleeve against the action of said biasing means;

said pair of mating couplings being movable axially to positions in which the side opening pockets in each coupling are positioned to receive the flange segments of the other and the end openings are in interfacing relationship, said mating couplings being thereafter movable rotationally to positions in which the flange segments interfit within the pockets, said locking means being free to move under action of said biasing means into said locking position when the flange segments are interfitted within the pockets to block relative rotation of the flange segments and the claws in a direction effecting removal of the flange segments from the pockets.

2. A locking hose coupling according to claim 1, wherein said biasing means comprises a coil spring.

3. A locking hose coupling according to claim 2, further comprising means for preventing relative rotation between said coaxial sleeve and said coupling body.

4. A locking hose coupling according to claim 3, wherein said means for preventing relative rotation comprises a key and a keyway interconnecting said coaxial sleeve with said coupling body.

5. A locking hose coupling according to claim 4, wherein said key extends from said coaxial sleeve and interfits into said keyway, said keyway being in said coupling body.

6. A locking hose coupling according to claim 1, wherein each mating coupling further comprises sealing means disposed at said end opening, each of said sealing means being in compressive engagement when the end openings of said mating couplings are in interfacing relationship and said flange segments are interfitting within said pockets, wherein said sealing means is an elastomeric material.

7. A locking hose coupling according to claim 6, wherein said sealing means is an elastomeric material having a durometer of about 60 on the A scale of Shore hardness.

8. A locking hose coupling according to claim 7, wherein said sealing means comprises an internal gland having an annular sealing surface facing outwardly of said end opening of said coupling and a back surface disposed on said gland opposite said sealing surface and being exposed to the air pressure internal to the coupling to effect a tight seal between said mating couplings.

9. A locking hose coupling comprising a pair of mating couplings for joining hose segments, each of said mating couplings including a coupling body with an axial bore, an end opening, radial claws and interspaced diametrically opposed flange segments adjacent said end opening, each said claw having a side opening pocket positioned to receive a flange segment on the other coupling of said pair, the improvement comprising:

a coupling locking means comprising a coaxial sleeve on the coupling body of one coupling of the pair of mating couplings, said locking means further comprising a locking projection extending axially from said sleeve in the direction of said end opening of said one coupling;

means for axially biasing said locking means to a locking position blocking relative rotation of the flanges of said one coupling and the claws of an other coupling of the pair of mating couplings, said biasing means urging said locking projection into said locking position intermediate one of said claws and said flange segments of said one coupling, said projection being movable axially away from said locking position by movement of said sleeve against the action of said biasing means said pair of mating couplings being movable axially to positions in which the side opening pockets in each coupling are positioned to receive the flange segments of the other and the end openings are in interfacing relationship, said mating couplings being thereafter movable rotationally to positions in which the flange segments interfit within the pockets, said locking means being free to move under action of said biasing means into said locking position when the flange segments are interfitted within the pockets to block relative rotation of the flange segments and the claws in a direction effecting removal of the flange segments from the pockets.

10. A locking hose coupling according to claim 9 in which said locking means comprises a second coaxial sleeve on said other coupling, said locking means further comprising a second locking projection extending axially from said second sleeve in the direction of said end opening of said other coupling;

second means for axially biasing said locking means to a locking position blocking relative rotation of the flanges of said one coupling and the claws of said other coupling, said second biasing means urging said second locking projection into a locking position intermediate one of said claws and said flange segments on said other coupling, said second projection being movable axially away from said locking position by movement of said second sleeve against the action of said second biasing means.

11. A locking hose coupling according to claim 9, wherein said biasing means comprises a coil spring.

12. A locking hose coupling according to claim 9, further comprising means for preventing relative rotation between said coaxial sleeve and said one coupling of the pair of mating couplings.

13. A locking hose coupling according to claim 12, wherein said means for preventing relative rotation comprises a key and a keyway interconnecting said coaxial sleeve with said one coupling.

14. A locking hose coupling according to claim 13, wherein said key extends from said coaxial sleeve and interfits into said keyway, said keyway being in said one coupling.

15. A locking hose coupling according to claim 9, wherein each mating coupling further comprises sealing means disposed at said end opening, each of said sealing means being in compressive engagement when the end openings of said mating couplings are in interfacing relationship and said flange segments are interfitting within said pockets, wherein said sealing means is an elastomeric material.

16. A locking hose coupling according to claim 15, wherein said sealing means is an elastomeric material having a durometer of about 60 on the A scale of Shore hardness.

17. A locking hose coupling according to claim 16, wherein said sealing means comprises an internal gland having an annular sealing surface facing outwardly of said end opening of said coupling and a back surface disposed on said gland opposite said sealing surface and being exposed to the air pressure internal to the coupling to effect a tight seal between said mating couplings.

18. A locking hose coupling according to claim 6, wherein said sealing means is an elastomeric material having a durometer between 40 and 60 on the A scale of Shore hardness.

19. A locking hose coupling according to claim 15, wherein said sealing means is an elastomeric material having a durometer between 40 and 60 on the A scale of Shore hardness.

20. A locking hose coupling according to claim 1 wherein said locking means further comprises a second locking projection extending axially from said sleeve in the direction of said end opening, said biasing means urging said second locking projection into said locking position intermediate another of said claws and said flange segments, said second locking projection being movable axially away from said locking position by movement of said sleeve against the action of said biasing means.

21. A locking hose coupling according to claim 9, wherein said locking means further comprises a second locking projection extending axially from said sleeve in the direction of said end opening, said biasing means urging said second locking projection into said locking position intermediate another of said claws and said flange segments of said one coupling, said second locking projection being movable axially away from said locking position by movement of said sleeve against the action of said biasing means.

* * * * *